US009203223B2

(12) United States Patent
Nakanishi

(10) Patent No.: US 9,203,223 B2
(45) Date of Patent: Dec. 1, 2015

(54) ELECTRICAL CONNECTION BOX

(75) Inventor: Ryuji Nakanishi, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 575 days.

(21) Appl. No.: 13/579,232

(22) PCT Filed: Mar. 23, 2011

(86) PCT No.: PCT/JP2011/056885
§ 371 (c)(1),
(2), (4) Date: Aug. 15, 2012

(87) PCT Pub. No.: WO2011/125489
PCT Pub. Date: Oct. 13, 2011

(65) Prior Publication Data
US 2012/0307464 A1    Dec. 6, 2012

(30) Foreign Application Priority Data

Apr. 9, 2010    (JP) .................................. 2010-090573

(51) Int. Cl.
 H05K 5/00    (2006.01)
 H02G 3/16    (2006.01)
 B60R 16/023    (2006.01)
 H02G 3/08    (2006.01)

(52) U.S. Cl.
 CPC .............. *H02G 3/16* (2013.01); *B60R 16/0238* (2013.01); *H02G 3/086* (2013.01); *H02G 3/088* (2013.01)

(58) Field of Classification Search
 CPC ......................... H05K 5/0065; H05K 7/20445
 USPC ........................................ 361/679.01–679.07
 See application file for complete search history.

(56) References Cited

U.S. PATENT DOCUMENTS

2009/0294172 A1*    12/2009    Nakanishi et al. ............ 174/548
2009/0298310 A1    12/2009    Nakanishi et al.
2009/0298311 A1    12/2009    Nakanishi et al.

FOREIGN PATENT DOCUMENTS

| JP | U 61-69332 | 5/1986 |
|---|---|---|
| JP | A 2006-050814 | 2/2006 |
| JP | A 2009-219322 | 9/2009 |
| JP | A 2009-290941 | 12/2009 |
| JP | A 2009-291043 | 12/2009 |
| JP | A 2010-045918 | 2/2010 |

OTHER PUBLICATIONS

May 31, 2011 International Search Report issued in International Patent Application No. PCT/JP2011/056885.

* cited by examiner

*Primary Examiner* — Jerry Wu
(74) *Attorney, Agent, or Firm* — Oliff PLC

(57) ABSTRACT

Described herein is an electrical connection box. In certain aspects the electrical connection box includes a case; a circuit board disposed inside the case; and a connector housing disposed in an opening surrounded by an opening edge portion of a side wall of the case. In certain aspects, the opening edge portion can have a first opening edge portion, a second opening edge portion, and an arcuate notch in which the arcuate notch is configured to reduce, prevent, or inhibit entry of water into the connector housing.

13 Claims, 9 Drawing Sheets

ELECTRICAL CONNECTION BOX

CROSS-REFERENCE TO RELATED APPLICATIONS

This application claims priority to JP 2010-090573 filed on Apr. 9, 2010 and to PCT/JP2011/056885 filed on Mar. 23, 2011, the entire disclosures of which are hereby incorporated by reference in their entirety.

BACKGROUND

The exemplary embodiments described herein relate to an electric connection box configured in such a manner that a circuit board is stored in a case.

In the related art, an electric connection box described in JP 2006-50814 is an example of an electric connection box mounted for example on a vehicle and configured to execute a power distribution or a power disconnection of vehicle-mounted electric components such as a lamp, an audio device and the like. This electric connection box includes a connector housing disposed in an opening surrounded by an opening edge portion of a side wall of a case with respect to the case configured to store a circuit component having electronic components mounted on a circuit board in the interior thereof. The opening is opened downward and is configured to allow fitting of a mating connector from below. In this manner, by arranging the connector housing in the opening opened downward, even when water is adhered on the side wall of the case, the water runs downward. Therefore, it is extremely improbable that the running water flows into the opening from the opening edge portion and enters the connector housing.

SUMMARY OF THE INVENTION

However, depending on the inclination of the vehicle, there is a case where the direction in which the water adhered to the side wall of the case flows and the opening edge portion form a right angle. If the running water comes into contact with the opening edge portion at a right angle, the water may run around from the opening edge portion into the opening. Consequently, the water may enter the connector housing and reach a fitting surface between connectors.

The present disclosure addresses various problems such as the one described above. It is an object of the present disclosure to provide an electric connection box in which water-proof properties are improved with a simple configuration.

The disclosure herein relates to an electric connection box that can have a case, a circuit board stored in the case, and a connector housing disposed in an opening surrounded by an opening edge portion of a side wall of the case, wherein the connector housing allows fitting of a mating member from the opening, and the opening edge portion is formed with an arcuate notch.

Since the arcuate notch can be provided on the opening edge portion in the electric connection box as described above, water running along the side wall of the case to the notch at the opening edge portion does not come into contact with the notch at a right angle. Therefore, if water reaches the notch, water does not run into the opening and flow downward while being guided by the notch. Accordingly, entry of water into the connector housing may be reduced, prevented, or inhibited, so that the water-proof properties of the electric connection box may be improved.

According to the technology disclosed herein, an electric connection box, capable of having improved water-proof properties, may be provided with a simple configuration.

DETAILED DESCRIPTION

Figure 1:
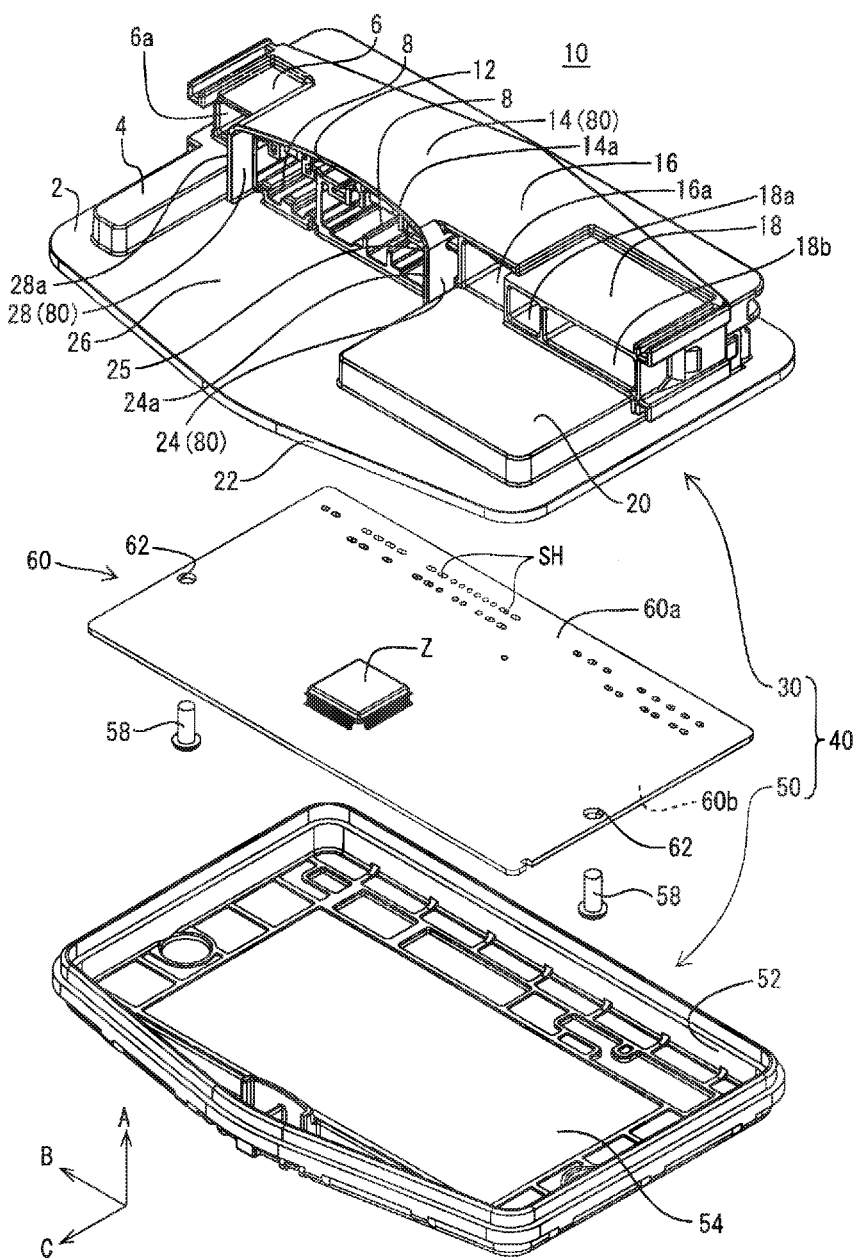
FIG. 1 is an exploded perspective view of an electric connection box 10 according to a first embodiment.
Figure 2:
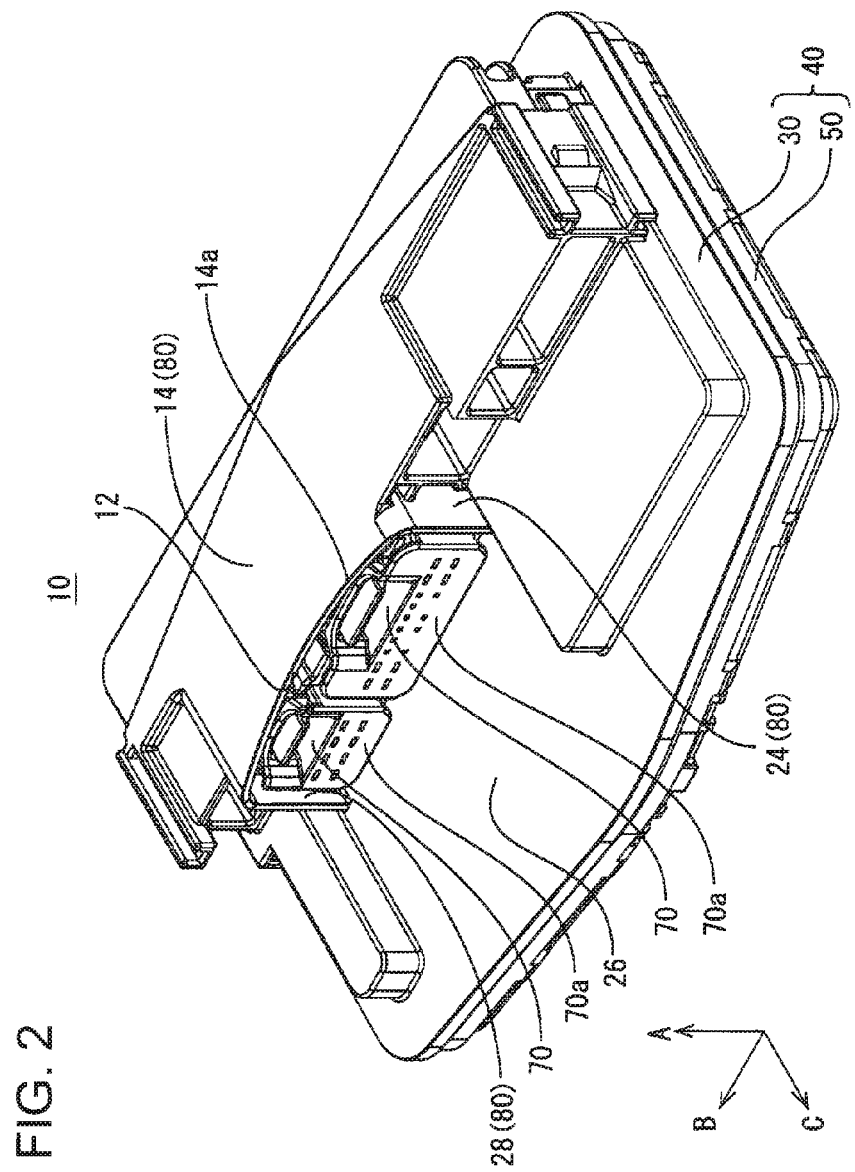
FIG. 2 is a perspective view of the electric connection box after mating connectors have been fitted.

FIG. 1 shows an exploded perspective view of an electric connection box 10 according to one embodiment. Also, FIG. 2 shows a perspective view of the electric connection box 10 after mating connectors 70 have been fitted. As shown in FIG. 1, the electric connection box 10 can include a circuit board 60 and a case 40. The electric connection box 10 can be disposed between a power source, not shown, and vehicle-mounted electric components (not shown) such as a lamp, a horn and the like to execute a power distribution and a power disconnection of the vehicle-mounted electric components. In the following description, the direction indicated by an arrow A in FIGS. 1 and 2 is defined as the front side and the direction opposite therefrom is defined as the back side. Also, the direction indicated by an arrow B in FIGS. 1 and 2 is defined as the left side and the direction opposite therefrom is defined as the right side. Also, the side in the direction indicated by an arrow C in FIGS. 1 and 2 is defined as the down side and the opposite side therefrom is defined as the upper side.

The circuit board 60 can be configured in such a manner that an electronic product Z such as a semiconductor relay can be mounted on a printed board having a rectangular shape having a power conductive path, not shown, formed by a print wiring technology. Also, the circuit board 60 can have a moisture-proof insulative coating (a thin film formed by applying liquid resin by spray or the like) so that the electric performance is not affected even when water is adhered on the circuit board 60 by condensation or the like. Provided on the lateral left and right side of the circuit board 60 are a pair of screw holes 62, 162. Also, a plurality of through holes SH penetrating through the circuit board 60 can be provided on the circuit board 60. In the following description, the surface on the front side (the surface on which the electronic product Z is mounted) of the circuit board 60 is referred to as a front surface 60a and the surface on the back side is referred to as a back surface 60b.

The case 40 can include a first cover 30 and a second cover 50, which may be formed into a flat shape having a lateral width larger than the width in the vertical direction, and can be configured to store the entire circuit board 60 in the interior thereof. The circuit board 60 can be stored in the case 40 with the front surface 60a side covered with the first cover 30 and the back surface 60b side covered with the second cover 50.

The second cover 50 can be formed of a synthetic resin, and can include a plate-shaped portion 54 having a plate shape and a peripheral wall 52 extending upright from a peripheral edge of the plate-shaped portion 54 toward the front side by a small extent. The plate-shaped portion 54 can have a shape one size larger than the circuit board 60, projecting downward at a center of the lower end thereof, and can have a substantially pentagonal shape as a whole. The plate-shaped portion 54 may be provided with a water-drain hole, not shown, at the center of the lower end thereof. In this manner, with the provision of the water-drain hole on the second cover 50, water entered into the case 40 can be discharged to the outside. The peripheral wall 52 can continue over the entire circumference of the peripheral edge of the plate-shaped portion 54 without discontinuity. The peripheral wall 52 can function as a side wall which covers four sides of the outer periphery of the circuit board 60 stored in the case 40.

The first cover 30 can be formed of a synthetic resin, and the outer shape can have the substantially same shape as the second cover 50. Therefore, in the same manner as the second cover 50, the first cover 30 can be provided with a plate-shaped portion 2, and a peripheral wall 22 extending upright from a peripheral edge of the plate-shaped portion 2 toward the back side by a small extent. The plate-shaped portion 2 may have a shape one size larger than the circuit board 60, projecting downward at a center of the lower end thereof, and can have a pentagonal shape as a whole. Provided on the back side of the first cover 30 are bosses (not shown) opposing the screw holes 62 of the circuit board 60 when the circuit board 60 is stored in the case 40. The circuit board 60 can be secured to the bosses with screws 58 via the screw holes 62 of the circuit board 60, and is fitted to the back side of the first cover 30. As the configuration of the first cover 30 on the front side will be described later in detail.

As shown in FIG. 2, when the first cover 30 and the second cover 50 are aligned, a distal end of the peripheral wall 22 of the first cover 30 can abut against a distal end surface of the peripheral wall 52 of the second cover 50, and the first cover 30 and the second cover 50 can be fixed to each other by, for example, oscillatory welding. Also, the distal end portions of the peripheral walls 22, 52 can be formed into a tapered shape to be easily soluble at the time of welding. Thus, after fixing the first cover 30 and second cover 50 to each other, the case 40 is entirely sealed by the above-described oscillatory welding except when a water-drain hole is present on one of the covers (e.g., the second cover 50).

Subsequently, the configuration of the front side of the first cover 30 will be described in detail. The front side of the plate-shaped portion 2 of the first cover 30 may have a portion, which forms the side wall of the case 40 when disposed between the power source and the vehicle-mounted electric components as the electric connection box 10. The front side of the first cover 30 which forms the side wall of the case 40 includes a pair of seat portions 4, 20, three hood portion side walls 6, 16, 18, a lower side wall 26, a first side wall 14, two second side walls 24, 28.

The pair of seat portions 4, 20 can be provided so as to project to the front side on the lateral left and right side below the front side of the plate-shaped portion 2. The hood portion side wall 6 can include an opening 6a provided above the seat portion 4 and opening downward. The hood portion side walls 16, 18 can be provided above the seat portion 20, respectively, and can include openings 16a, 18a, 18b opening downward. The lower side wall 26 can be a part of the surface of the plate-shaped portion 2 on the front side and can be positioned between the pair of seat portions 4, 20. The first side wall 14 and the second side walls 24, 28 can be provided above the lower side wall 26 between the hood portion side wall 6 and the hood portion side walls 16, 18. The second side walls 24, 28 extend upright vertically from the surface of the plate-shaped portion 2. The first side wall 14 can be arranged between the two second side walls 24, 28 substantially in parallel to the plate-shaped portion 2 and can continue to the two second side walls 24, 28.

The first side wall 14 and the second side walls 24, 28 can define an opening 25 opening downward. The opening 25 can be surrounded by a first opening edge portion 14a at a lower end of the first side wall 14, second opening edge portions 24a, 28a at lower ends of the second side walls 24, 28 and the lower side wall 26. Arranged in the opening 25 are connector housings 8. A plurality of (two in the embodiment) connector housings 8 can be arranged side by side in the lateral direction, and the respective connector housings 8 can be partitioned by a partitioning wall. The respective connector housings 8 allow fitting of the mating connectors 70 (an example of "mating member") as shown in FIG. 2. The mating connectors 70 are inserted from below the opening 25 into the opening 25 along the direction parallel to the lower side wall 26 and are fitted to the respective connector housings 8.

Figure 3:
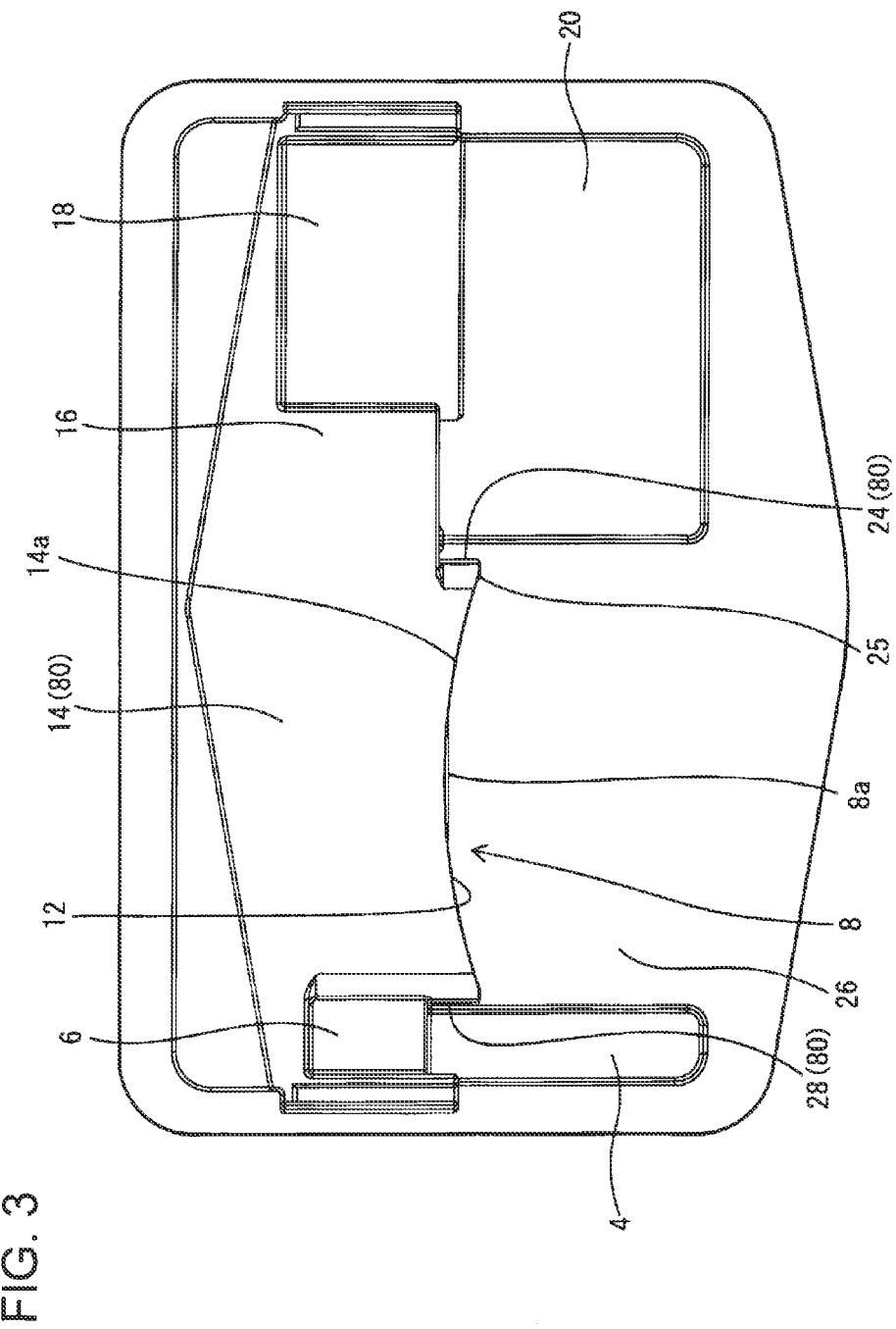
FIG. 3 is a front view of the electric connection box before the mating connectors are fitted.
Figure 4:
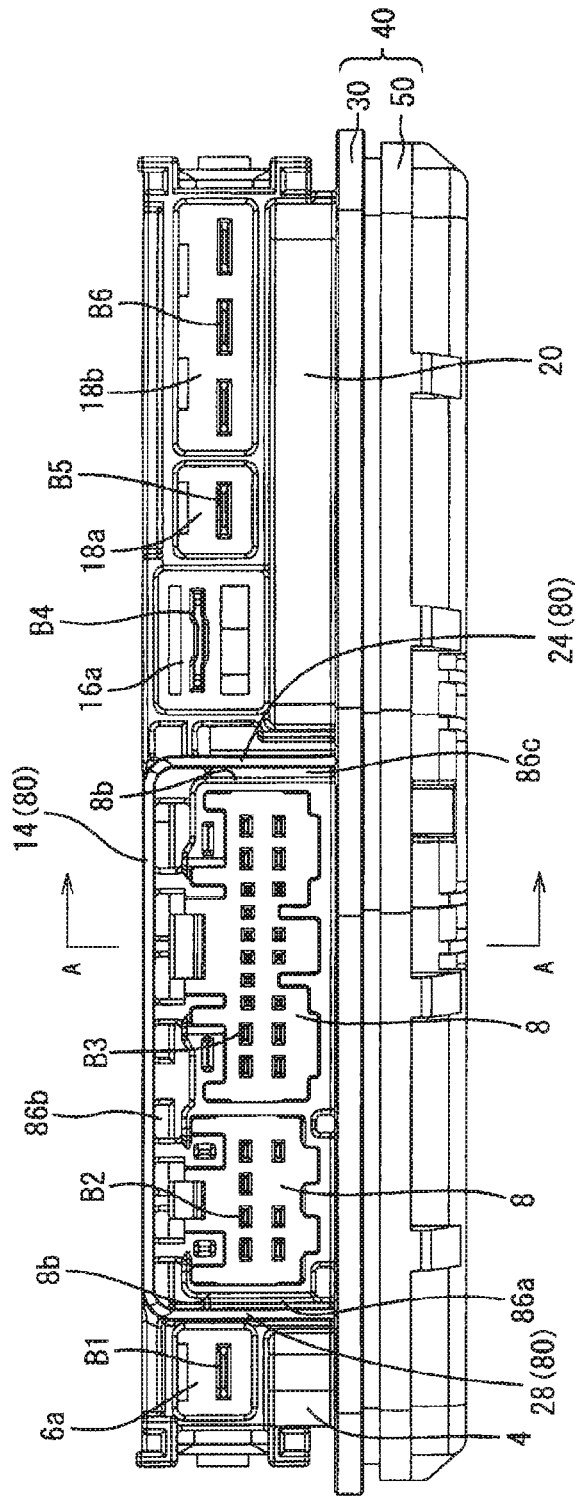
FIG. 4 is a bottom view of the electric connection box before the mating connectors are fitted.
Figure 5:
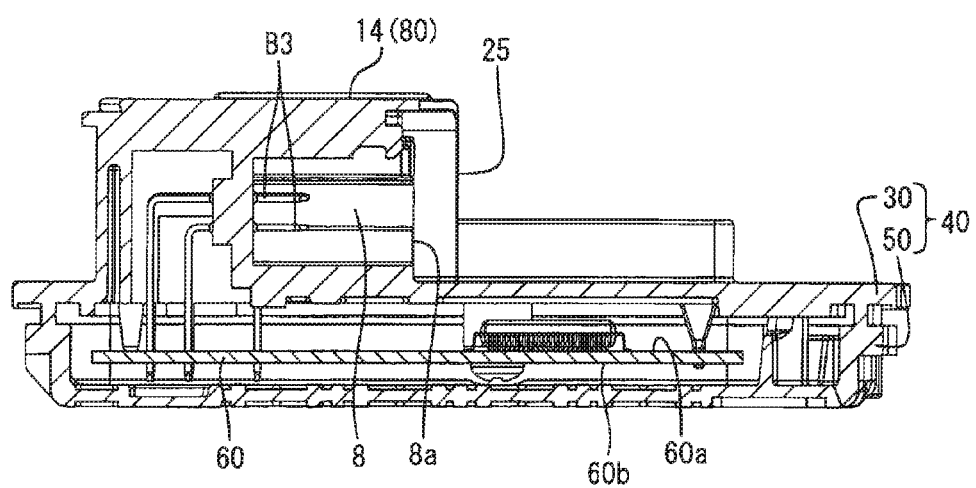
FIG. 5 is a cross-sectional view taken along the line A-A in FIG. 4.
Figure 6:
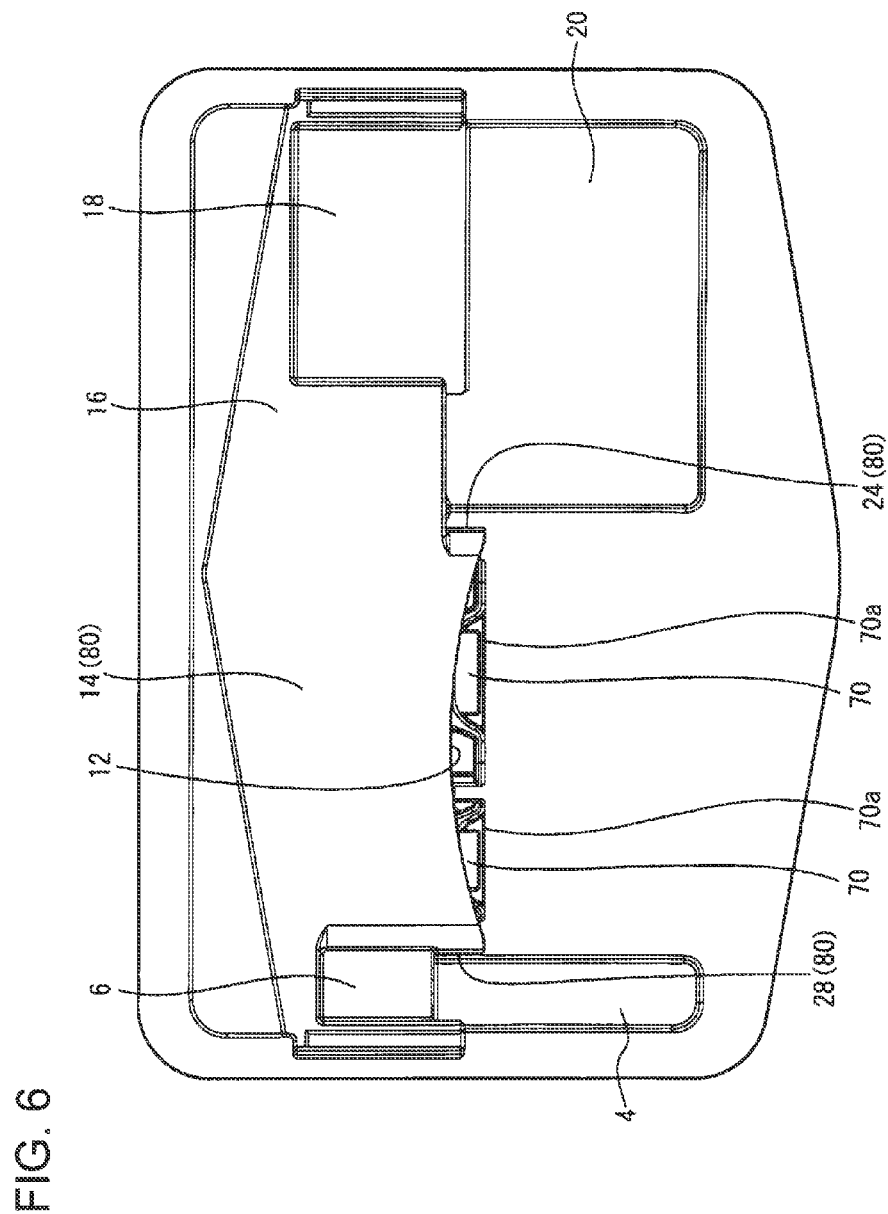
FIG. 6 is a front view of the electric connection box after the mating connectors have been fitted.

FIG. 3 shows a front view of the electric connection box 10 before the mating connectors 70 are fitted viewed from the front side. FIG. 4 shows a bottom view of the electric connection box 10 before the mating connectors 70 are fitted viewed from the below. Also, FIG. 5 shows a cross-sectional view of the electric connection box 10 in the vertical direction, and shows a cross-sectional configuration of the A-A cross section in FIG. 4. Also, FIG. 6 shows a front view of the electric connection box 10 after the mating connectors 70 are fitted viewed from the front side.

The first opening edge portion 14a can be provided with a gentle arcuate notch 12 from one end to the other end as shown in FIG. 2 and FIG. 3. Also, as shown in FIG. 2, the mating connectors 70 are provided with opposite surfaces 70a on the opposite side from the surface to be fitted to the connector housings 8. The opposite surfaces 70a may be positioned on the same plane as the opening 25 in a state in which the mating connectors 70 are fitted to the connector housings 8. For reference sake, fitting surfaces 8a of the respective connector housings 8 with respect to the mating connectors 70 can be provided inside the opening 25 as shown in FIG. 3.

As shown in FIG. 4, gaps 86a-86c can be provided between a surrounding wall 80 (the first side wall 14 and the two second side walls 24, 28), which surround the connector housings 8 and an outer surface 8b of the connector housings 8. More specifically, the gap 86b can be provided between the first side wall 14 and the outer surface 8b on the front side of the connector housings 8, the gap 86a can be provided between the second side wall 24 and the outer surface 8b on the left side of the connector housings 8, and the gap 86c can be provided between the second side wall 28 and the outer surface 8b on the right side of the connector housings 8. Therefore, the surrounding wall 80 and the outer surface 8b of the connector housings 8 can be apart from each other.

Also, as shown in FIG. 4, formed in the openings 6a, 16a, 18a, 18b of the respective hood portion side walls 6, 16, 18, and in the respective connector housings 8 are bus bars B1-B6 projecting downward from above (from the inner side to the near side of the opening) by insert molding. The respective bus bars B1-B6 can be formed by bending metal plates into an L-shape as shown in FIG. 5, and one end of each thereof projects into the corresponding respective connector housings 8. Then, the other ends of all of the respective bus bars B1-B5 can be drawn toward the circuit board 60, and can be configured to be inserted into the through holes SH of the circuit board 60.

Incidentally, the electric connection box 10 in which the mating connectors 70 are fitted to the connector housings 8 can be disposed between the power source and the vehicle-mounted electric components with the upper side of FIG. 1 oriented upward so that the board surfaces 60a, 60b of the circuit board 60 stored in the case 40 extend along the direction of the gravitational force (downward in FIG. 1, FIG. 2). When water is adhered to the first side wall 14 of the case 40 in this state, the water starts to flow downward toward the opening 25, and reaches the notch 12 of the first opening edge portion 14a. The water having reached the notch 12 of the first opening edge portion 14a, being bifurcated or kept as-is, can be guided by the notch 12, and flows toward the end portion of the first opening edge portion 14a. Then, the water flowing to the end portion of the first opening edge portion 14a runs along the second opening edge portion 24a (28a) and the lower side wall 26, and flows down to the outside of the case 40.

As describe above, since the arcuate notch 12 can be provided on the first opening edge portion 14a in the electric connection box 10 according to one embodiment, water running along the first side wall 14 to the notch 12 at the first opening edge portion 14a does not come into contact with the notch 12 at a right angle. Therefore, the water reaching the notch 12 does not run into the opening 25 but instead flows downward while being guided by the notch 12. Accordingly, entry of water into the connector housing 8 may be reduced, prevented, or inhibited, so that the water-proof properties of the electric connection box 10 may be improved.

Also, in this embodiment, the gaps 86a-86c can be provided between the surrounding wall 80, which surrounds the connector housings 8, and the outer surface 8b of the connector housings 8. Accordingly, even when water runs from the first opening edge portion 14a into the opening 25, the water enters the gaps 86a-86c, and hence entry of the water into the connector housings 8 can be effectively reduced, prevented, or inhibited.

Also, in this embodiment, the fitting surfaces 8a of the connector housings 8 with respect to the mating connectors 70 can be provided inside the opening 25. Therefore, the distances between the fitting surfaces 8a of the connector housings 8 with the mating connectors 70 and the first opening edge portion 14a are set to be long, and hence even when water runs around into the opening 25 from the first opening edge portion 14a, the water can hardly reach the fitting surfaces 8a.

Also, in this embodiment, the opposite surfaces 70a of the mating connectors 70 fitted to the connector housings 8 can be positioned on the same plane as the opening 25. Therefore, when the mating connectors 70 are fitted to the connector housings 8, the degree of fitting between the connector housings 8 and the mating connectors 70 may be detected by placing a jig or the like to the opening 25 in parallel, and checking the degree of abutment between the jig and the opposite surfaces 70a of the mating connectors 70. Consequently, the mating connectors 70 may be fitted reliably with respect to the connector housings 8, and entry of water into the connector housings 8 is effectively reduced, prevented, or inhibited.

Also, in this embodiment, the notch 12 can be provided from one end to the other end of the first opening edge portion 14a. Therefore, entry of water can be effectively reduced, prevented, or inhibited over the entire part of the first opening edge portion 14a, and the water-proof properties of the electric connection box 10 are further improved.

Also, in this embodiment, the circuit board 60 can be stored in the case 40 so that the board surfaces 60a, 60b extend along the direction of the gravitational force. Then, the first opening edge portion 14a can include the first opening edge portion 14a extending in parallel to the board surfaces 60a, 60b of the circuit board 60 stored in the case 40, and second opening edge portions 24a, 28a extending vertically with respect to the board surfaces 60a, 60b of the circuit board 60 stored in the case 40. Then, the notch 12 can be provided on the first opening edge portion 14a of the side wall of the case 40. Therefore, the water-proof effect are provided for the first opening edge portion 14a which is liable to be subject to a large amount of water running thereto.

Also, in this embodiment, the notch 12 can have an arcuate shape. Therefore, the water-proof effect can be uniform in the entire part of the notch 12, and hence the water-proof properties of the electric connection box 10 can be effectively improved.

Figure 7:
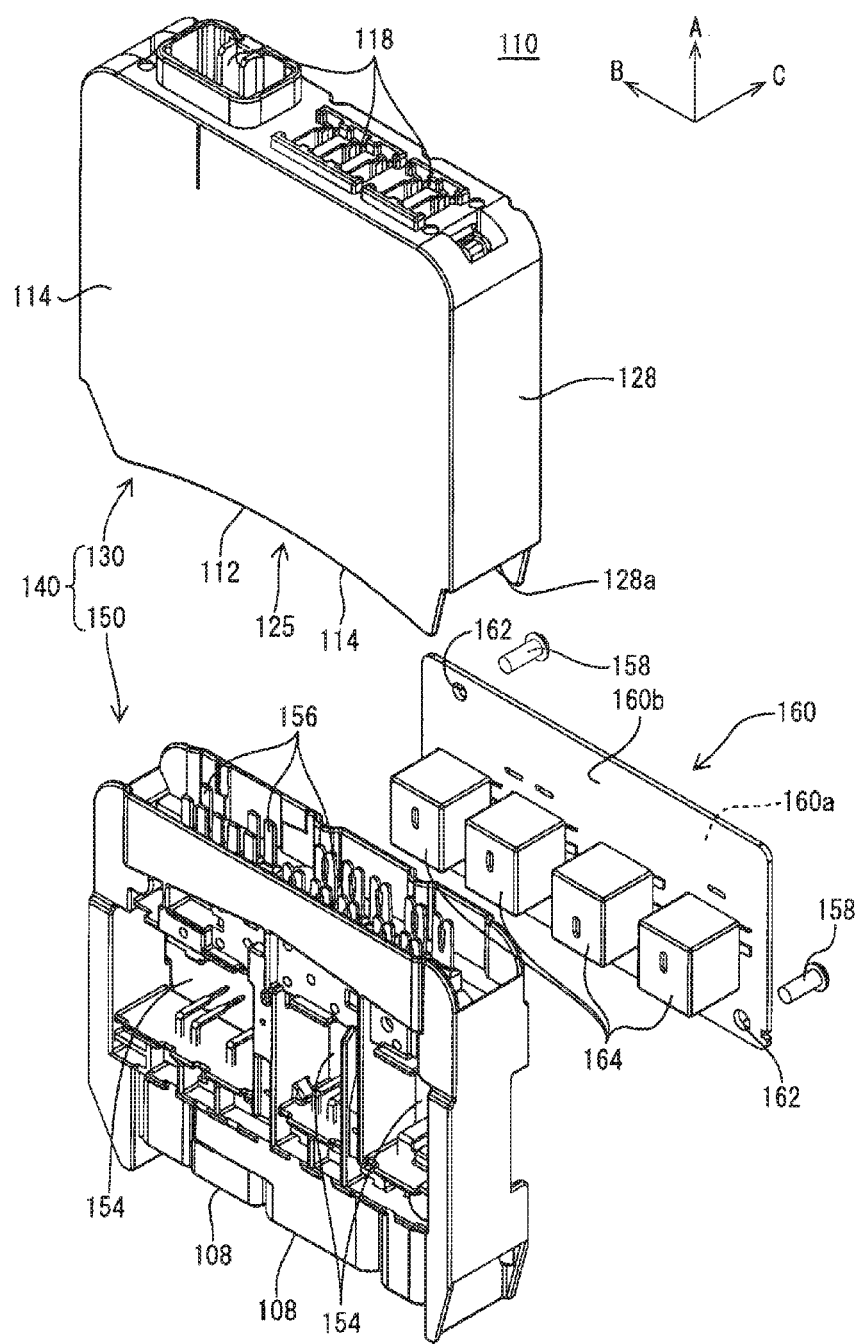
FIG. 7 is an exploded perspective view of an electric connection box 110 according to a second embodiment.
Figure 8:
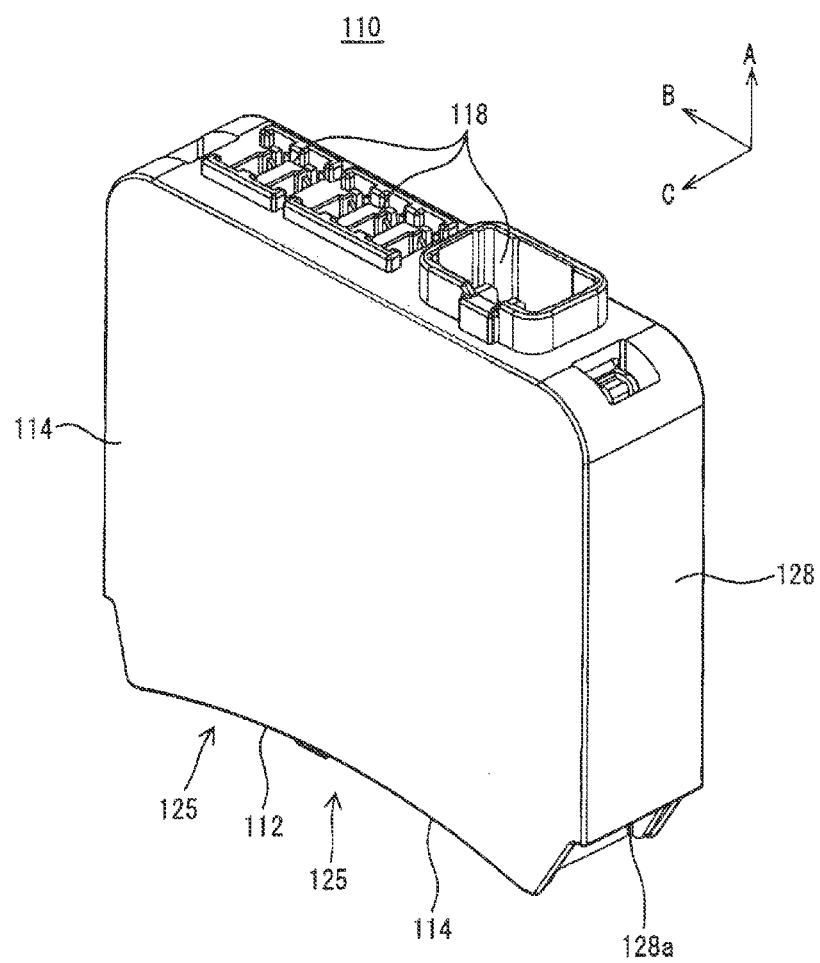
FIG. 8 is a perspective view of the electric connection box after mating connectors have been fitted.

Referring now to the drawings, a second embodiment will be described. FIG. 7 shows an exploded perspective view of an electric connection box 110 according to Embodiment 2. FIG. 8 shows a perspective view of the electric connection box 110 after mating connectors 170 have been fitted. As shown in FIG. 7, the electric connection box 110 includes a circuit board 160 and a case 140. Arrangement and function of the electric connection box 110 are the same as those in Embodiment 1 and hence are omitted. In the following description, the direction indicated by an arrow A in FIGS. 7, 8 is defined as the upper side and the direction opposite therefrom is defined as the down side. Also, the direction indicated by an arrow B in FIGS. 7, 8 is defined as the left side and the direction opposite therefrom is defined as the right side. Also, the side in the direction indicated by an arrow C in FIGS. 7, 8 is defined as the front side and the opposite side therefrom is defined as the back side.

Since the configuration of the circuit board 160 can be the same as the first embodiment, the description will be omitted. Here, the surface of the front side of the circuit board 60 is referred to as a front surface 160a, and the surface on the back side is referred to as a back surface 160b. The back surface 160b of the circuit board 160 is provided with a plurality of projecting portions 164 having a rectangular shape projecting toward the back side. Provided on the lower right side and the upper left side of the circuit board 160 are a pair of screw holes 162, 162.

The case 140 includes an outside case 130 and an inner side case 150, and can be formed into a square cylindrical shape having a cylinder axis extending in the vertical direction, and can be configured to store the entire circuit board 160 in the interior thereof. The circuit board 160 can be stored in the outside case 130 together with the inner side case 150 in a state in which the projecting portions 164 can be attached to the inner side case 150 by being fitted to the inner side case 150.

The inner side case 150 can be formed of a synthetic resin, and can include a plurality of fitting opening portions 154, connector housings 108, a terminal group 156. Three of the fitting opening portions 154 can be arranged side by side in the lateral direction at positions in the vicinity of the center in the vertical directions of the inner side case 150 so as to penetrate through the inner side case 150 from the front to the back. The connector housings 108 are configured to be capable of fitting to the mating connectors 170 (an example of the "mating member") and can be provided at lower end portions of the inner side case 150 in a state in which fitting surfaces (not shown) with respect to the mating connectors 170 are exposed downward. The terminal group 156 may be provided at upper end portion of the inner side case 150 in a state in which terminal shafts projecting upward. Also, provided on the front side of the inner side case 150 are bosses (not shown) opposing screw holes 162 of the circuit board 160 when the circuit board 160 is fitted to the inner side case 150. The circuit board 160 can be attached to the front side of the inner side cover 150 with the projecting portions 164 fitted to the fitting opening portions 154, and secured to the bosses with the screws 158 via the screw holes 162 of the circuit board 160.

The outside case 130 can be formed of a synthetic resin, and includes an upper end surface which covers an upper end of the outside case 130, two first side walls 114 provided on the front side and the back side of the outside case 130, two second side walls 128 provided on both of the left and right sides of the outside case 130, a terminal hole group 118 provided on an upper end surface. Two of the first side walls 114 and two of the second side walls 128 define an opening 125 opening downward of the outside case 130. The opening 125 can be surrounded by a first opening edge portion 114a at a lower end of the first side walls 114, and a second opening edge portion 128a at lower ends of the second side walls 124, 128, so that the inner side case can be inserted from the opening 125. The terminal hole group 118 penetrates through the upper end surface of the outside case 130 in the vertical direction.

As shown in FIG. 8, the inner side case 150 in which the circuit board 160 is fitted can be inserted from the opening 125 on the lower side of the outside case 130, so that the inner side cover 150 is stored in the interior of the outside case 130, and the outside case 130 and the inner side case 150 are fixed to each other. Accordingly, the connector housing of the inner side case 150 can be disposed in the opening 125 of the outside case 130 and the terminal group 156 of the inner side case 150 is disposed in the interior of the terminal hole group 118 of the outside case 130.

Figure 9:
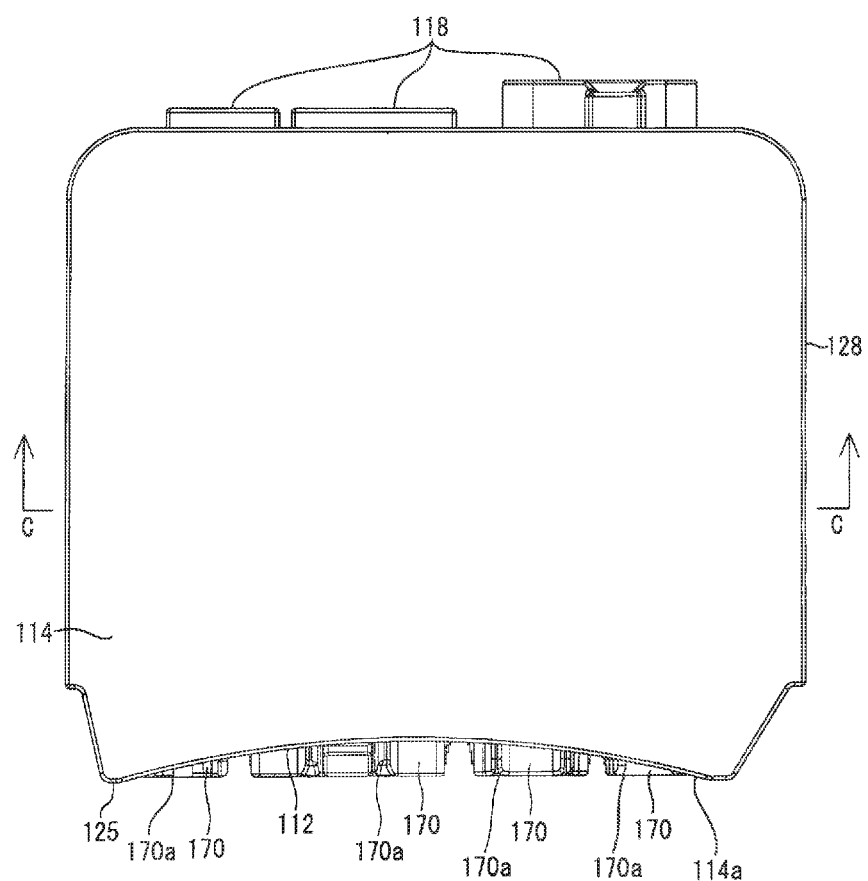
FIG. 9 is a front view of the electric connection box after the mating connectors have been fitted.
Figure 10:
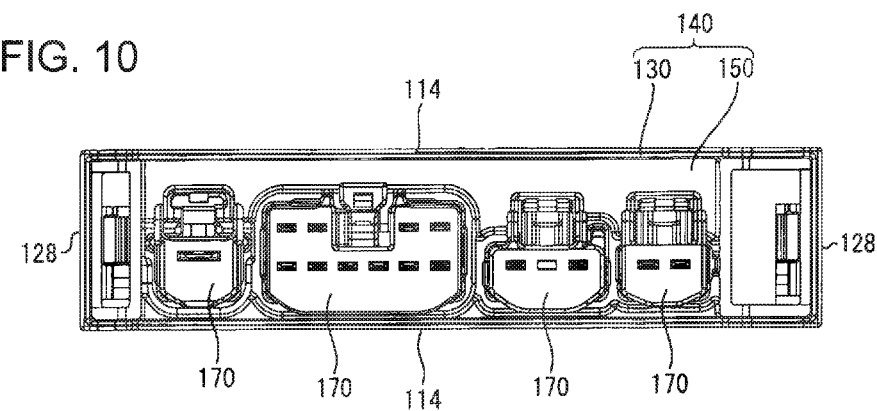
FIG. 10 is a cross-sectional view taken along the line C-C in FIG. 9.

FIG. 9 shows a front view of the electric connection box 110 after the mating connectors 170 have been fitted viewed from the front side. Also, FIG. 10 shows a bottom view of the electric connection box 110 after the mating connectors 170 have been fitted viewed from below.

The first opening edge portion 114a of the outside case 130 can be provided with a gentle arcuate notch 112 from one end to the other end as shown in FIG. 8, FIG. 9. Also, the mating connectors 170 can be provided with opposite surfaces 170a on the opposite side from the surface to be fitted to the connector housings 170. The opposite surfaces 170a can be positioned on the same plane as the opening 125 of the outside case 130 in a state in which the mating connectors 170 are fitted to the connector housing 108.

In a state in which the inner side case 150 can be inserted into the outside case 130, a gap is provided between a surrounding wall (the lower portion of the first side walls 114 and the lower portion of the second side walls 128) which surrounds the outside connector housing 108 and the outer surface 108 of the connector housing 108. Therefore, in a state in which the mating connectors 170 are fitted to the connector housing 108, as shown in FIG. 10, a gap can be formed between the mating connectors 170 and the surrounding wall.

Incidentally, the electric connection box 110 in which the mating connectors 170 are fitted to the connector housings 108 of the inner side case 150 is disposed between the power source and the vehicle-mounted electric components with the upper side of FIG. 7 oriented upward so that the board surfaces 160a, 160b of the circuit board 160 fitted in the inner case 150 extend along the direction of the gravitational force (downward in FIG. 7, FIG. 8). When water is adhered to the first side wall of the case 140 in this state, the water starts to flow downward toward the opening 125, and reaches the notch 112 of the first opening edge portion 114a. The water having reached the notch 112 of the first opening edge portion 114a, being bifurcated or kept as-is, can be guided by the notch 112, and flows toward the end portion of the first opening edge portion 114a. Then, the water flowing to the end portion of the first opening edge portion 114a flows down to the outside of the case 140.

Although the configuration in which the notch can be formed only on the first opening edge portion has been employed in the respective embodiments described above, a configuration in which the notches are formed on both of the first opening edge portion and the second opening edge portion may be employed. Alternatively, a configuration in which the notch is provided only on the second opening edge portion may also be employed.

Although the configuration in which one notch is formed from one end to the other end of the first opening edge portion has been employed in the embodiments described above, a configuration in which a plurality of notches can be formed on one opening edge portion may be employed.

In addition to the respective embodiments described above, the arrangement, the shape, or the like of the notches may be modified as needed.

In addition to the respective embodiments described above, the configuration in which the arcuate notch is provided on the opening edge portion of the side wall of the case may be applied to various electric connection boxes.

Although the embodiments of the present invention have been described in detail, these descriptions are exemplary, and do not limit the scope of the claims. The technologies described in the claims include various modifications or alterations of the detailed examples shown above.

Also, the technical components described herein demonstrate their technical effectiveness solely or in various combinations, and are not limited to the combinations described in the claims at the time of application. Also, the technologies exemplified in this specification or the drawings are capable of achieving a plurality of objects simultaneously, and have technical effectiveness by achieving one of the objects.

The technology disclosed in this specification relates to an electric connection box that can include a case, a circuit board stored in the case, and a connector housing disposed in an opening surrounded by an opening edge portion of the side wall of the case, wherein the connector housing allows fitting of a mating member from the opening, and the opening edge portion can be formed with an arcuate notch.

Since the arcuate notch can be provided on the opening edge portion in the electric connection box described above, water running along the side wall of the case to the notch at the opening edge portion does not come into contact with the notch at a right angle. Therefore, the water reaching the notch does not run around into the opening and instead flows downward while being guided by the notch. Accordingly, entry of water into the connector housing may be reduced, prevented, or inhibited, so that the water-proof properties of the electric connection box may be improved.

Gaps may be provided between a surrounding wall which is part of the side wall of the case and surrounds the connector housings and the outer surface of the connector housings.

In this configuration, even when water runs from the opening edge portion around into the opening, the water enters the gaps. Thus, entry of the water into the connector housings can be effectively reduced, prevented, or inhibited.

The fitting surface of the connector housings with respect to the mating members may be provided inside the opening.

In this configuration, a long distance may be provided between the fitting surface of the connector housings with respect to the mating members and the opening edge portion. Accordingly, even when water runs from the opening edge portion into the opening, the water can hardly reach the fitting surfaces between the connectors, so that the water-proof properties of the electric connection box may be improved.

The mating members can each have an opposite surface provided on the opposite side from the surfaces to be fitted into the connector housings, and the opposite surfaces of the mating members fitted into the connector housings may be positioned on the same plane as the opening.

In this configuration, when the mating members are fitted to the connector housings, the degree of fitting between the connector housings and the mating members may be detected by placing a jig or the like to for example, the opening in parallel, and checking the degree of abutment between the jig and the opposite surfaces of the mating members. Therefore, the mating members may be fitted reliably with respect to the connector housings, and entry of water into the connector housings is effectively prevented or inhibited.

The notch may be provided from one end of the opening edge portion to the other end.

In this configuration, running around into the opening of the water may be reduced, prevented, or inhibited over the entire opening edge portion, so that the water-proof properties of the electric connection box may further be improved.

The circuit board may be stored in the case so that the board surface extends along the direction of gravitational force, the opening edge portion may include a first opening edge portion parallel to the board surface of the circuit board stored in the case and a second opening edge portion vertical to the board surface of the circuit board stored in the case, and the notch may be provided on the first opening edge portion of the side wall of the case.

In certain aspects as described above, since the circuit board can have a plate shape, the width of the first opening edge portion can be generally broader than the width of the second opening edge portion, larger amount of water may easily flow down toward the first opening edge portion in comparison with the second opening edge portion. According to the configuration described above, the water-proof effect may be provided to the first opening edge portion which is liable to be subject to a larger amount of water flowing down thereto.

The case can have a flat shape covering the front and back of the circuit board stored in the case, and the connector housings may be parts of the case.

In this configuration, the water-proof properties may be improved in the electric connection box configured with the case formed into a flat shape.

The first opening edge portion may be provided above the center position of the circuit board stored in the case in the vertical direction.

In this configuration, water adhered to the side wall of the case positioned below the center position of the circuit board in the vertical direction can be positioned below the first opening edge portion, and hence does not reach the first opening edge portion. Therefore, water adhered to the side wall of the case can be inhibited from reaching the first opening edge portion, and the water-proof properties of the electric connection box may be improved.

The case may have a rectangular cylindrical shape covering the front and back of the circuit board stored in the case, and the connecting housings may be separate members from the case and may be storable from the opening.

In this configuration, in the electric connection box including the case formed into a cylindrical shape and the connector housings stored in the case, the water-proof properties may be improved.

In certain aspects, the notch may be formed into an arcuate shape. In this configuration, since the curvature of the notch is uniform in all the parts thereof, the water-proof effect may be equalized at all the parts of the notch, so that the water-proof properties of the electric connection box may be improved effectively.

REFERENCE NUMERALS 2, 54 plate-shaped portion
4, 20 seat portion
6, 16, 18 hood portion side wall
6a, 16a, 18a, 18b opening (of hood portion)
8, 108 connector housing
8a fitting surface
8b outer surface (of connector housing)
10, 110 electric connection box
12, 112 notch
14, 114 first side wall
14a, 114a first opening edge portion
22, 52 peripheral wall
24, 28, 128 second side wall
24a, 28a, 128a second opening edge portion
25, 125 opening
26 lower side wall
30 first cover
40, 140 case
50 second cover
58, 158 screw
60, 160 circuit board
60a, 160a front surface (of circuit board)
60b, 160b back surface (of circuit board)
62, 162 screw hole
70, 170 mating connector
70a, 170a opposite surface
86a, 86b, 86c gap
118 terminal hole group
130 outside case
150 inner side case
154 fitting opening portion
156 terminal group
164 projecting portion

The invention claimed is:

1. An electric connection box comprising:
a case comprising first, second, third and fourth side walls, the first and third side walls being substantially parallel with respect to one another, the second and fourth side walls being substantially parallel with respect to one another and substantially perpendicular to the first and third side walls, the case having an opening edge portion at one end, the opening edge portion having an opening defined by the first, second, third and fourth side walls;
a circuit board disposed inside the case, the circuit board having a back surface configured to receive a plurality of projecting portions; and a connector housing disposed in the case from the opening of the opening edge portion of the case,
wherein the opening edge portion has a first opening edge portion on at least one of the first and third side walls, a second opening edge portion on at least one of the second and fourth side walls, and at least one arcuate notch provided on at least one of the first opening edge portion and the second opening edge portion, the arcuate notch being configured to guide and reduce, prevent, or inhibit entry of water into the connector housing.

2. The electric connection box according to claim 1, wherein a gap is provided between inner surfaces of the first, second, third and fourth side walls of the case and an outer surface of the connector housing.

3. The electric connection box according to claim 1, wherein the connector housing is configured to allow fitting of a mating member through the opening, and
at least a portion of a fitting surface of the connector housing with respect to the mating member is provided inside the opening.

4. The electric connection box according to claim 3, wherein the mating member has a fitting surface provided on a side facing the fitting surface of the connector housing, the fitting surface of the mating member configured to be fitted into the connector housing, and
the fitting surface of the mating member when fitted into the connector housing is positioned on substantially the same plane as the opening.

5. The electric connection box according to claim 1, wherein the arcuate notch is provided on the first opening edge portion.

6. The electric connection box according to claim 1, wherein the circuit board is stored in the case so that the back surface of the circuit board extends along the direction of gravitational force,
the first opening edge portion is parallel to a plane of the back surface of the circuit board stored in the case,
the second opening edge portion is perpendicular to the plane of the back surface of the circuit board stored in the case, and
the arcuate notch is provided on the first opening edge portion.

7. The electric connection box according to claim 6, further comprising an inner case,
wherein the first and third walls of the case are substantially flat and are configured to cover the front and back of the circuit board stored in the case, and
the connector housing is part of the inner case.

8. The electric connection box according to claim 7, wherein the first opening edge portion is provided below a center position of the circuit board stored in the case in the direction of gravitational force.

9. The electric connection box according to claim 6, wherein the opening has a substantially rectangular shape,
the case completely covers the circuit board when disposed inside the case, and
the connector housing is a separate member from the case.

10. The electric connection box according to claim 1, wherein the case further comprises a first cover and a second cover, the first cover and second cover independently having peripheral end portions, the peripheral end portions of the first and second cover are fixedly joined to each other to form the case.

11. The electric connection box according to claim 1, further comprising an inner case, wherein the inner case is disposed inside the case.

12. The electric connection box according to claim 1, wherein the connector housing is formed on at least one of the first, second, third and fourth side walls of the case.

13. The electric connection box according to claim 11, wherein the connector housing is disposed in the inner case and the connector housing is accessible on a bottom end portion of the case in a direction of gravitational force.

* * * * *